3,069,481
PREPARATION OF TETRAHALOMETHANES

Robert Neville Haszeldine, Disley, England, Hyman Iserson, Springfield Township, Montgomery County, Pa., and Francis E. Lawlor, Wilmington, Calif., assignors to Pennsalt Chemicals Corporation, Philadelphia, Pa., a corporation of Pennsylvania
No Drawing. Filed June 3, 1959, Ser. No. 817,737
10 Claims. (Cl. 260—664)

This invention relates to a new and improved method for the preparation of carbon tetrachloride.

This application is a continuation-in-part of Serial No. 613,397, filed October 2, 1956, and now abandoned.

Many attempts have been made to manufacture carbon tetrachloride by the pyrolysis of phosgene, according to the equation:

$$2COCl_2 \rightarrow CCl_4 + CO_2$$

These attempts are summarized by Fink and Bonnilla in J. Phys. Chem. 37, 1152 (1933). In general the maximum conversions of $CCl_4$ which have been obtained previously are of the order of about 1%.

In accordance with the present invention phosgene is pyrolysed in the presence of activated carbon at temperatures between about 300° C. and about 700° C., preferably between about 400° C. and about 600° C., and at pressures between about 1000 p.s.i.g. and about 10,000 p.s.i.g., preferably between about 3500 p.s.i.g. and about 8500 p.s.i.g. to give carbon tetrachloride in conversions over 10%. In the presence of small amounts of a reactive fluorine compound such as $COF_2$ conversions of nearly 20% have been obtained. When the catalyst is treated with the halide of a transition metal, such as ferric chloride or ferric fluoride or a mixture thereof, the conversion can be increased to nearly 30% of the theoretical.

In carrying out the process according to the invention phosgene may be introduced into a pressure vessel along with the carbon catalyst and, if desired, between about 0.1 and about 0.8 mole of a reactive fluorine compound such as $COF_2$, per mole of $COCl_2$. The temperature of the vessel is then raised to between about 300 and about 700° C., preferably between about 400 and 600° C. and the pressure is kept between about 1000 p.s.i.g. and about 10,000 p.s.i.g., preferably between about 3500 p.s.i.g. and about 8500 p.s.i.g. The time of reaction is simply that necessary to give optimum yields. Usually it is on the order of from 1 to about 15 hours. When the reaction is complete, the vessel is then cooled and the products collected and separated.

In another embodiment of the invention, the process can be carried out by starting with carbon monoxide and chlorine in place of phosgene. About the stoichiometric amounts of the two gases necessary to form phosgene in situ are used, i.e., 72 parts by weight of chlorine with 28 parts carbon monoxide to form 100 parts of phosgene. A 5 to 10% excess of either compound may be used without affecting undesirably the formation of carbon tetrachloride.

As pointed out, the catalyst used in the present invention is activated carbon. Various types of this material available on the market may be used. The commercial activated carbon is preferably freed to a large degree from materials which could react with phosgene under the conditions of the catalytic process to reduce the yield of carbon tetrachloride. These materials include, for example, water and compounds of non-metallic elements of the group silicon, sulfur, and phosphorus. These undesired materials are adequately removed by a purification process which comprises heating the commercial carbon with hydrogen fluoride. Hydrogen chloride and elemental chlorine can also be used for this purpose.

In a preferred purification method, the carbon is placed in a pressure vessel with between about 0.02 and about 0.3 times its own weight of anhydrous hydrogen fluoride and heated to between about 100 and about 400° C. for from 5 to 300 minutes. After the HF has had a chance to react with any impurities present in the carbon, the vessel is evacuated and maintained under a pressure of between about 0.1 and about 10 mm. Hg absolute and at the elevated temperatures referred to for another 5 to 60 minutes. The treated carbon is then suitable for use in catalysing the process according to the invention.

It is believed that in this treatment the hydrogen fluoride reacts also with small amounts of transition elements and other metals which are present in the activated carbon, converting these metal elements to fluorides which remain deposited on the carbon and play an important part in the catalysis. The amounts and identity of metals which are present in the untreated carbon vary and are dependent upon the origin of the carbon. Typical analyses of the carbons used in the examples are shown in Table I.

Table 1

| Metal | Estimated percent by weight (spectroscopic) | |
|---|---|---|
| | A [1] | B [2] |
| Magnesium | 0.01 –0.09 | 0.05–0.09 |
| Aluminum | | 0.35–0.63 |
| Calcium | 0.01 –0.09 | 0.13–0.23 |
| Chromium | 0.01 –0.09 | |
| Manganese | 0.01 –0.09 | 0.10–0.18 |
| Iron | 0.01 –0.09 | 0.25–0.45 |
| Nickel | 0.01 –0.09 | |
| Copper | 0.001–0.009 | |

[1] Cliffchar No. 6—A mixed northern American hardwood carbon derived from 80% birch and 10% beechwood.
[2] Carbon 207C—A hardwood carbon supplied by Sutcliffe-Speakman Limited, Great Britain.

Although the reaction to form carbon tetrachloride may be conducted with an untreated carbon catalyst, or with carbon treated only as described above, improved yields are obtained when the carbon is additionally impregnated with one or more of the transition elements in compound form. The halides of the transition elements, for example, ferric chloride or ferric fluoride or a mixture of these, are especially preferred for this purpose. The halide can be of one of the transition elements listed in Table I, e.g. a halide of chromium, manganese, iron, nickel, or molybdenum. However, a halide of any of the transition elements can be used, particularly those of groups IV to VIII inclusive of the periodic table. The transition elements are all metals. An authoritative description of their physical and chemical characteristics is given by Therald Moeller, Inorganic Chemistry, An Advanced Textbook, John Wiley & Sons, Inc., New York (1952), Chapter 20, "The Transition Elements." From a practical standpoint, it is preferred to use a halide of one of the more plentiful metals, e.g., a halide of titanium, zirconium, vanadium, tantalum, chromium, molybdenum, tungsten, manganese, iron, cobalt, or nickel. The rarer and more expensive halides of iridium, palladium, and platinum are next preferred. Use of the halides of the still rarer scandium, ytterbium, lanthanum, hafnium, niobium, technetium, rhenium, ruthenium, osmium, and rhodium is also possible and is limited only by their limited availability and high cost. The halides of iron, cobalt or nickel, particularly ferric chloride, or ferric fluoride, or a mixture of these, are especially preferred because of their availability and low cost.

The amount of transition element compound added will preferably be between about 1 and about 60% calculated as a halide or its equivalent, based on the weight of the carbon. The compound may be deposited on the carbon in any convenient manner, for example, by saturating the carbon with an aqueous solution of the compound and then drying; or by dry mixing the anhydrous transition metal compound, e.g. ferric chloride, with the carbon, followed by heating and, if necessary, by the addition of a fluorinating agent.

The invention is further described in the following specific examples.

EXAMPLE I

A 300 ml. stainless steel (No. 316) autoclave is loaded with 86 g. activated carbon (Cliffchar No. 6) which has been impregnated with a small amount of iron chloride and fluoride, and 7 ml. anhydrous hydrogen fluoride were introduced. The autoclave was closed, placed in an electrical heater, and heated at 250° C. for one hour. It was then connected to a Monel trap which was cooled by liquid oxygen, and was in series with a vacuum pump. The system was kept under vacuum while the autoclave was heated to 250° and kept at that temperature for one hour. The autoclave was then removed, cooled in liquid oxygen, and 140 g. phosgene and 18 g. fluorophosgene were distilled into it under vacuum. It was then heated in a salt bath at 425° for 8 hours, cooled, and vented to oxygen-cooled traps. Final venting was accomplished by heating the autoclave to 250° under vacuum while it was connected to a liquid oxygen-cooled trap. The weight of the product thus obtained was 143 g. The traps containing the products form the reaction were separately connected to a vacuum system, evacuated, and allowed to warm up to room temperature so that the volatile components distilled into the vacuum system. By infra-red analysis of the volatile gases, it was established that they consisted of $COCl_2$, chlorofluorophosgene, dichlorodifluoromethane, chlorotrifluoromethane, some tetrafluoromethane, carbon dioxide, carbon tetrachloride, and possibly some trichloromonofluoromethane.

Fifty-eight g. of liquid did not volatilize. This was shown by infra-red analysis to consist of $CCl_4$, $CCl_3F$ and dissolved $COCl_2$. On distillation through a 6" glass helices packed column of 0.5" diameter there was first observed evolution of gas; 16 g. liquid which still contained phosgene and had a boiling point range of from 26° to 74° C. were obtained and then 29.5 g. liquid boiling point 74–77°, $n_D^{27}$ 1.4565. This last was substantially all $CCl_4$. The holdup from the column solidified and was found to be hexachloroethane (about 2 g.).

EXAMPLE II

Eighty-five g. activated carbon (Cliffchar No. 4) were placed in a 300 ml. stainless steel (No. 316) autoclave, 10 ml. of anhydrous hydrogen fluoride were added, and the autoclave was placed in an electrical heater at 225° for one hour, and then evacuated while at this temperature for 45 minutes. The autoclave was cooled in liquid oxygen and 142 g. $COCl_2$ and 18.8 g. of $COF_2$ were distilled into it under vacuum. It was closed and heated for 8 hours at 425°. It was then cooled and vented into a liquid oxygen-cooled trap (142 g. obtained).

The trap was connected to the vacuum system, evacuated, and the liquid oxygen bath was removed so that the product could volatilize into the vacuum system. There remained 54 g. which did not volatilize. This residual liquid was washed successively with cold aqueous sodium bisulfite solution, aqueous sodium carbonate and water, and the water insoluble oil (29 g.) was dried with Drierite. Distillation through a 6" column of 0.5" diameter packed with stainless steel helices gave:

(1) 4.5 g., boiling point 50–74°, slow distillation, odor of phosgene still noticeable.
(2) 20.8 g., boiling point 74–77°, $n_D^{24}$ 1.4570. Infra-red analysis of the liquid and of its vapor confirmed the identity of this fraction as carbon tetrachloride.

The holdup from the column weighed 2 g. It solidified on cooling, and had the camphoraceous odor of $C_2Cl_6$.

EXAMPLE III

Seventy g. carbon (Cliffchar No. 6) were placed in a 300 ml. stainless steel (No. 316) autoclave and 8 ml. of anhydrous hydrogen fluoride were added. The autoclave was heated at 225° for one hour and then evacuated while at this temperature for another hour. One hundred and fifty g. $CoCl_2$ were introduced under vacuum and then the autoclave was heated in a salt bath at 425° for eight hours. It was then vented to a still pot cooled by Dry Ice-acetone till it was at atmospheric pressure, and then venting was completed by heating the autoclave to 250° C. and evacuating it while it was connected to a trap cooled with liquid oxygen. The reaction products were combined and distilled through a 2 ft. column packed with stainless steel helices. After a substantial amount of the unreacted phosgene was removed, the residual liquid which weighed 19 g. was transferred to a 50 cc. flask and distilled through a 6" column. There was then obtained 7 g. liquid boiling point 27–70° which contained $CCl_4$ and $COCl_2$ and 9 g. liquid boiling point 76–78° which was mostly $CCl_4$. The two fractions were combined, 2 g. $AlCl_3$ was added, and the mixture was distilled. The distillate, B.P. 74–78°, weighed 14 g. An infra-red analysis showed that it was $CCl_4$.

EXAMPLE IV

A 100 ml. stainless steel autoclave was loaded two-thirds full with active carbon pellets (Sutcliffe-Speakman 207C) mixed with 10 g. of animal charcoal powder. 3 g. of anhydrous ferric chloride, 2 g. of chlorine, 1.5 g. of nickel carbonyl and 2 g. of iron carbonyl were added. The autoclave was heated to 400° C. for 12 hours. It was then cooled to room temperature and pumped out with a vacuum pump for 5 hours. 5.6 g. of carbon monoxide and 17.5 g. of chlorine were then added to the autoclave. The autoclave was closed and heated to about 430° C. for 16 hours.

The autoclave was then cooled to room temperature. Carbon dioxide, carbon monoxide and phosgene were found in the volatile products evolved when the autoclave was vented. The autoclave was attached to a vacuum system and heated gradually to 350° C. over a two-hour period. A liquid condensate was collected. The liquid was washed with dilute sodium hydroxide solution, dried over phosphorus anhydride and distilled. 2.4 g. of carbon tetrachloride were collected.

EXAMPLE V 10 g. of ammonium molybdate are dissolved in just enough hot water to form a saturated solution. The solution is poured over 85 g. of activated carbon (Cliffchar No. 6) and the carbon pellets are thoroughly blended. The pellets are gradually heated with mixing to remove the water. The pellets are cooled to room temperature and 10 ml. of anhydrous hydrogen fluoride are then added. The pellets are reheated until sublimation of ammonium fluoride ceases. The pellets are then placed in a 300 ml. stainless steel (No. 316) autoclave. The autoclave is connected to a vacuum pump and then heated to 250° C. for one hour while maintaining a vacuum. The autoclave is cooled and then chilled in liquid oxygen. 150 g. of phosgene are introduced into the autoclave. The autoclave is then heated in a salt bath at 425° C. for eight hours. The autoclave is then cooled. Carbon tetrachloride is recovered from the reaction mass as described in Example III.

EXAMPLE VI

Following the general procedure of Example V, 85 g. of activated carbon is impregnated with about 30 grams of tungstic acid and treated with about 20 grams of anhydrous hydrofluoric acid. The treated pellets are heated under vacuum at 250° C. and cooled. The catalyst is then used in the conversion of phosgene to carbon tetrachloride as in Example V.

EXAMPLE VII 85 g. of activated carbon pellets are treated with 10 g. of tantalum pentafluoride dissolved in concentrated hydrofluoric acid. The carbon is then dried and heated to 200° C. under vacuum. The impregnated pellets are used as catalyst in the conversion of phosgene to carbon tetrachloride as in Example V.

EXAMPLE VIII 85 g. of activated carbon pellets are mixed with 10 g. of titanium tetrafluoride dissolved in alcohol. The alcohol is evaporated. The pellets are placed in a stainless steel autoclave and 8 ml. of anhydrous hydrogen fluoride are added. The autoclave is evacuated and heated at 225° C. for one hour under vacuum. The carbon pellets are then used as catalyst in the conversion of phosgene to carbon tetrachloride as in Example V.

Many widely different embodiments of this invention may be made and many process variables obvious to those skilled in the art may be introduced without departing from the scope and spirit thereof and it is to be understood that our invention includes all such embodiments and is not to be limited by the above description.

We claim:
1. A method for the manufacture of carbon tetrachloride which comprises pyrolyzing phosgene at a temperature between about 300° C. and about 700° C. and at a pressure between about 1000 p.s.i.g. and 10,000 p.s.i.g. in the presence of an activated carbon catalyst substantially freed from non-metallic inorganic materials and water.

2. The method according to claim 1 wherein the pyrolysis is carried out in the presence of $COF_2$.
3. The method according to claim 1 wherein the catalyst contains the halide of a transition metal selected from a class consisting of groups IV to VIII inclusive of the periodic table.
4. The method according to claim 3 wherein the transition metal is iron.
5. The method according to claim 3 wherein the transition metal is nickel.
6. The method according to claim 3 wherein the transition metal is molybdenum.
7. The method according to claim 3 wherein the transition metal is tantalum.
8. The method according to claim 3 wherein the transition metal is titanium.
9. The method according to claim 1 wherein the temperature is between about 400° C. and about 600° C. and the pressure is between about 3500 p.s.i.g. and about 8500 p.s.i.g.
10. The method according to claim 1 and comprising purifying the catalyst by treating it with hydrogen fluoride prior to said pyrolysis.

References Cited in the file of this patent
UNITED STATES PATENTS

| | | |
|---|---|---|
| 801,100 | Machalske | Dec. 26, 1905 |
| 2,892,875 | Kung | June 30, 1959 |

OTHER REFERENCES

Fink et al.: J. Phys. Chem. 37, 1135–67 (1933).
Stock et al.: Z. Anorg. Chem. 195, 140–8 (1931).
Stock et al.: Z. Anorg. Chem. 147, 245–55 (1925).

UNITED STATES PATENT OFFICE
CERTIFICATE OF CORRECTION

Patent No. 3,069,481                                                         December 18, 1962

Robert Neville Haszeldine et al.

It is hereby certified that error appears in the above numbered patent requiring correction and that the said Letters Patent should read as corrected below.

Column 2, Table I, line 2 of footnote 1, for "80% birch and 10% beechwood" read -- 80% maple, 10% birch and 10% beechwood --.

Signed and sealed this 25th day of June 1963.

(SEAL)
Attest:

ERNEST W. SWIDER                                          DAVID L. LADD
Attesting Officer                                           Commissioner of Patents